United States Patent
Calo et al.

(10) Patent No.: US 8,965,845 B2
(45) Date of Patent: Feb. 24, 2015

(54) PROACTIVE DATA OBJECT REPLICATION IN NAMED DATA NETWORKS

(71) Applicant: International Business Machines Corporation, Armonk, NY (US)

(72) Inventors: Seraphin B. Calo, Cortlandt Manor, NY (US); Raheleh B. Dilmaghani, Elmsford, NY (US); Bong Jun Ko, Harrington Park, NJ (US); Kang-Won Lee, Nanuet, NY (US); Vasileios Pappas, Elmsford, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/708,143

(22) Filed: Dec. 7, 2012

(65) Prior Publication Data
US 2014/0164321 A1    Jun. 12, 2014

(51) Int. Cl.
*G06F 17/00* (2006.01)
*G06F 17/30* (2006.01)

(52) U.S. Cl.
CPC ............................... *G06F 17/30575* (2013.01)
USPC .................. 707/610; 707/783; 707/E17.005; 709/223; 709/212; 709/227; 370/392; 370/254

(58) Field of Classification Search
CPC ............ G06F 21/6218; G06F 21/6227; G06F 15/17331; G06F 17/30575; G06F 17/30; G06F 21/62; G06Q 10/10; H04L 45/28; H04L 45/00; H04L 29/0653; H04L 49/3009; H04L 41/12; H04L 45/02; H04L 29/08549; H04L 29/06
USPC .......... 707/783, E17.005, 626, 610; 709/212, 709/227, 226, 223, 241, 214, 217, 231, 709/204; 370/392, 254; 718/1
See application file for complete search history.

(56) References Cited

U.S. PATENT DOCUMENTS

| | | | |
|---|---|---|---|
| 5,437,029 A * | 7/1995 | Sinha | 709/245 |
| 6,167,127 A * | 12/2000 | Smith et al. | 379/209.01 |
| 6,167,427 A | 12/2000 | Rabinovich et al. | |
| 6,338,149 B1 * | 1/2002 | Ciccone et al. | 714/38.12 |
| 6,484,204 B1 | 11/2002 | Rabinovich | |
| 6,563,454 B2 | 5/2003 | Akasu | |
| 7,339,937 B2 | 3/2008 | Mitra et al. | |
| 7,555,527 B1 * | 6/2009 | Slaughter et al. | 709/213 |
| 7,606,868 B1 | 10/2009 | Le et al. | |
| 8,762,570 B2 | 6/2014 | Qian et al. | |

(Continued)

OTHER PUBLICATIONS

Junchen Jiang and Hui Zhang (Carnegie Mellon University, School of Computer Science, Pittsburgh, PA, USA)—"Deadline-aware data plane for internet video"—Proceeding CoNEXT Student '12 Proceedings of the 2012 ACM conference on CoNEXT student workshop Dec. 10, 2012, pp. 55-56.*

(Continued)

*Primary Examiner* — Anh Ly
(74) *Attorney, Agent, or Firm* — Scully, Scott, Murphy & Presser, P.C.; Preston J. Young, Esq.

(57) ABSTRACT

The present disclosure relates generally to the field of proactive data object replication in named data networks. In various examples, proactive data object replication may be implemented in one or more named data networks in the form of systems, methods and/or algorithms.

7 Claims, 5 Drawing Sheets

(56) References Cited

U.S. PATENT DOCUMENTS

| | | |
|---|---|---|
| 2003/0037094 A1 | 2/2003 | Douceur et al. |
| 2004/0054807 A1 | 3/2004 | Harvey et al. |
| 2006/0106755 A1* | 5/2006 | Stuhec ............................ 707/1 |
| 2006/0165053 A1 | 7/2006 | Bhatnagar et al. |
| 2007/0067280 A1 | 3/2007 | Zhou et al. |
| 2007/0156841 A1* | 7/2007 | Balakrishnan et al. ....... 709/217 |
| 2007/0283410 A1 | 12/2007 | Hsu |
| 2008/0005199 A1* | 1/2008 | Chen et al. .................... 707/204 |
| 2008/0071925 A1* | 3/2008 | Leighton et al. .............. 709/241 |
| 2008/0183774 A1 | 7/2008 | Otani et al. |
| 2008/0294678 A1* | 11/2008 | Gorman et al. ............... 707/102 |
| 2009/0049575 P1 | 2/2009 | Cook |
| 2009/0192996 A1 | 7/2009 | Guo et al. |
| 2009/0252164 A1* | 10/2009 | Zijst ............................. 370/390 |
| 2009/0287835 A1 | 11/2009 | Jacobson |
| 2010/0185583 A1 | 7/2010 | Berinde et al. |
| 2010/0250742 A1* | 9/2010 | Leighton et al. .............. 709/224 |
| 2011/0090908 A1 | 4/2011 | Jacobson et al. |
| 2012/0054155 A1* | 3/2012 | Darcy .................. 707/E17.005 |
| 2012/0089690 A1* | 4/2012 | Hein et al. .................... 709/206 |
| 2013/0114594 A1* | 5/2013 | Van Zijst ..................... 370/390 |
| 2013/0219081 A1* | 8/2013 | Qian et al. .................... 709/241 |
| 2014/0023075 A1* | 1/2014 | Calo et al. .................... 370/392 |
| 2014/0023076 A1* | 1/2014 | Calo et al. .................... 370/392 |
| 2014/0164321 A1 | 6/2014 | Calo et al. |
| 2014/0164328 A1 | 6/2014 | Calo et al. |
| 2014/0173074 A1* | 6/2014 | Dilmaghani et al. ......... 709/223 |
| 2014/0173080 A1* | 6/2014 | Dilmaghani et al. ......... 709/223 |

OTHER PUBLICATIONS

Jun Li et al.—"Delivering Internet-of-Things services in MobilityFirst Future Internet Architecture"—Published in: Internet of Things (IOT), 2012 3rd International Conference on the; Date of Conference: Oct. 24-26, 2012 pp. 31-38.*

DiMarco, TT. et al., "Use of Alias Names to Reference Objects", IP.com, Mar. 30, 2005, pp. 297-302.

Speice, DC. et al., "Method for Browsing Aliases and Network Names", IP.com, Mar. 30, 2005, pp. 51-52.

Alimi, R. et al., "A Survey of In-Network Storage Systems", IP.com, Dec. 4, 2011, pp. 1-44.

Song, Y. et al., "Power-aware Traffic Engineering with Named Data Networking", Mobile Ad-hoc and Sensor Networks (MSN), 2011 Seventh International Conference, Dec. 16-18, 2011, pp. 289-296.

* cited by examiner

PROACTIVE DATA OBJECT REPLICATION IN NAMED DATA NETWORKS

BACKGROUND

The present disclosure relates generally to the field of proactive data object replication in named data networks.

In various examples, proactive data object replication may be implemented in one or more named data networks in the form of systems, methods and/or algorithms.

DESCRIPTION OF RELATED ART

Named data networking (sometimes referred to herein as "NDN") is a paradigm in which data object requests (e.g., from a consumer or broker) are routed to a data entity (or data object) using a name such as, for example, specified using alphanumeric characters (in contrast to machine addresses in traditional IP networks). In the NDN paradigm, a user (or consumer) requests a named data object by name from a data producer (such a request is sometimes called "interest"). The user's request is forwarded towards the data producer (possibly through one or more NDN brokers) based on the name of the data object in the request. The data producer (or any intermediate broker) then responds with the requested data object.

Figure 1:
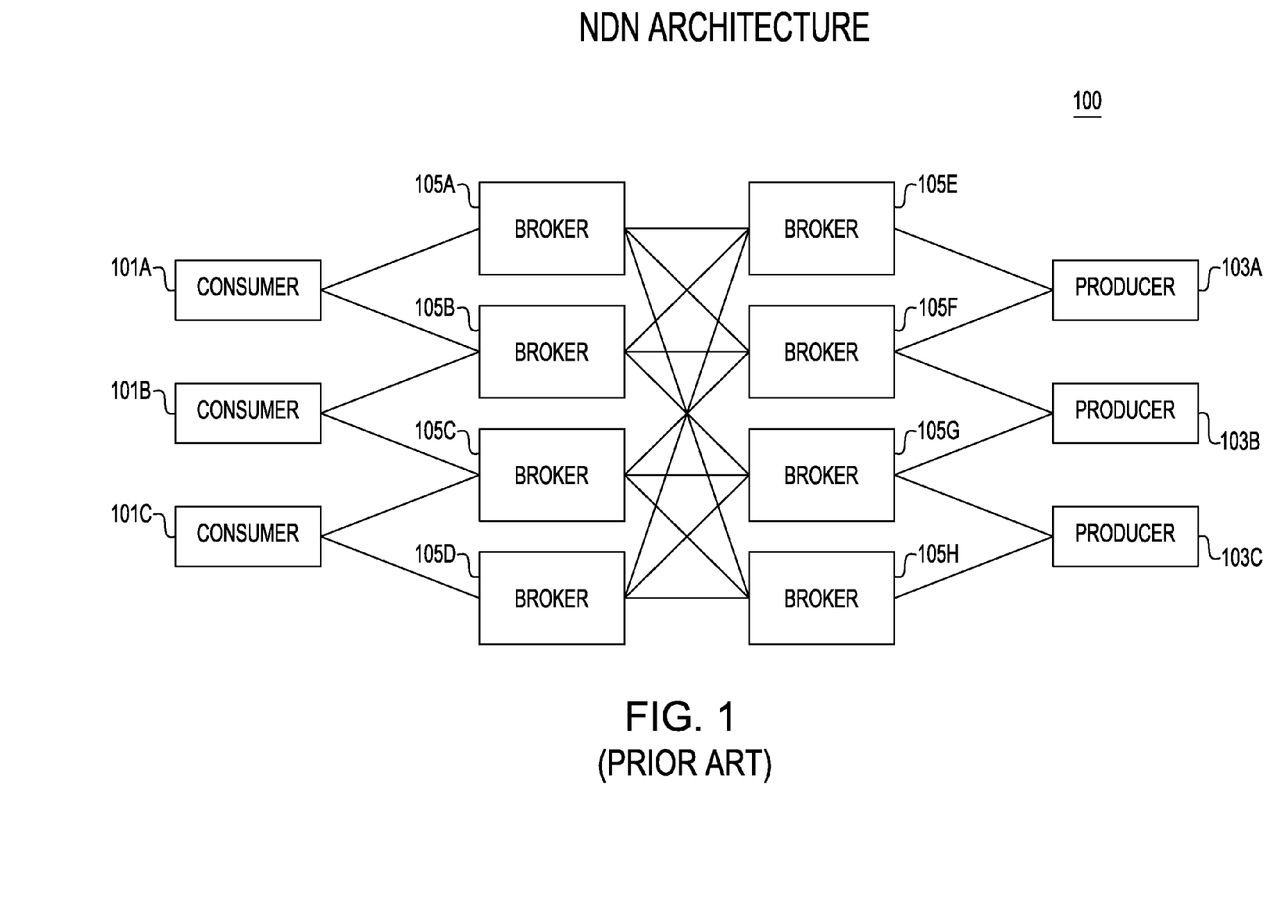
FIG. 1 depicts a block diagram of a conventional named data networking architecture.

FIG. 1 shows an example of a conventional named data networking architecture 100. As seen in this example, consumers 101A, 101B and 101C interact with producers 103A, 103B and 103C via brokers 105A, 105B, 105C, 105D, 105E, 105F, 105G and/or 105H.

Still referring to FIG. 1, communication (e.g., e.g., requests, responses, data objects) between and among the various entities (indicated by the solid lines between the entities) may be bi-directional. Further, the communication may be carried out via the Internet, an intranet, datacenter network, cloud networks, a local area network, a wide area network and/or any other desired communication channel(s).

Of note, while FIG. 1 shows the various entities communicating, it is to be understood that this FIG. 1 is actually referring to communication by computer system(s) or the like that are owned, leased, operated, used by, in the possession of and/or controlled by each of the entities.

In conventional IP-based and named data datacenters/networks, hotspots are created by frequent access to popular data objects—e.g. servers that contain popular data objects that are accessed frequently can become hotspots.

In conventional IP-based and named data datacenters/networks, hotspot problems are handled by replicating servers, VM, and/or storage content, and distributing them to less congested areas of the datacenter/network.

In conventional IP-based and named data datacenters/networks this typically requires planning and configuration changes at both the network layer (such as updating routing information at switches and/or reconfiguring the load balancers) and at the server layer (such as replicating data content, hosting a new VM or connecting to a new storage system), and possibly configuring the load balancer in front of the servers if multiple servers serve the same content.

SUMMARY

The present disclosure relates generally to the field of proactive data object replication in named data networks.

In various examples, proactive data object replication may be implemented in one or more named data networks in the form of systems, methods and/or algorithms.

In one embodiment, a method implemented in a computer system for replicating at least one data object that is hosted in a named data network is provided, the method comprising: determining, with the computer system, a popularity of the data object that is hosted in the named data network; determining, with the computer system, a number of replicas of the data object to be created, wherein the determination of the number of replicas to be created is based at least in part upon the determined popularity of the data object; and replicating, with the computer system, the data object to create the determined number of replicas.

In another embodiment, a computer readable storage medium, tangibly embodying a program of instructions executable by the computer for replicating at least one data object that is hosted in a named data network is provided, the program of instructions, when executing, performing the following steps: determining, with the computer system, a popularity of the data object that is hosted in the named data network; determining, with the computer system, a number of replicas of the data object to be created, wherein the determination of the number of replicas to be created is based at least in part upon the determined popularity of the data object; and replicating, with the computer system, the data object to create the determined number of replicas.

In another embodiment, a computer-implemented system for replicating at least one data object that is hosted in a named data network is provided, the system comprising: a popularity determining unit configured to determine a popularity of the data object that is hosted in the named data network; a number of replicas determining unit that is in operative communication with the popularity determining unit and that is configured to determine a number of replicas of the data object to be created, wherein the determination of the number of replicas to be created is based at least in part upon the determined popularity of the data object; and a replicating unit in operative communication with the number of replicas determining unit configured to replicate the data object to create the determined number of replicas.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

For the purposes of description, the term "data object" is intended to refer to a sequence of bytes of a given length. Such a data object can be, for example, a single addressable content that a user can request. In other examples, a data object can be a segment of a file, or a file (e.g., HTML document), or a collection of files (e.g., HTML document with associated data objects), or a sequence of bytes that is generated dynamically. In other examples, a data object can be an audio file, a video file or a web page. In another example, a data object can be a part of a large file (e.g., a movie file can be broken down into multiple parts, each of which can be individually addressed and downloaded).

For the purposes of description, the term "node" is intended to refer to a router, a switch and/or a server.

For the purposes of description, the term "cache" is intended to refer to any desired storage device (associated with a router, switch, and/or server).

For the purposes of description, the term "random" or "randomly" is intended to refer to being actually random or pseudo-random (e.g., such as may typically be obtained using a computer system).

For the purposes of description, the term "opportunistic data object replication" is intended to refer to a conventional NDN concept that can be used to naturally balance the network load in response to data access. Pursuant to such opportunistic data object replication, popular data objects can be cached (due to previous requests on the same path) at the nodes that are potentially close to the requestors.

For the purposes of description, the term "proactive data object replication" is intended to refer to data object replication based upon a determination of a popularity of the data object (e.g., historical popularity, predicted popularity, value of popularity, popularity trend) even before the quality of service (e.g., congestion level, packet drop ratio) degrades.

For the purposes of description, the term "popularity" is intended to refer to how often a data object is requested and/or accessed.

For the purposes of description, the term "hotspot" is intended to refer to a point of congestion that typically occurs in a datacenter/network due to frequent access to popular data objects on servers.

For the purposes of description, the term "over subscription ratio" is intended to refer to the ratio between the bandwidth provided by sum of access level links and the higher level link. For example if you have twenty 100 Mbps access ports and a single trunk out with 1 Gbps the ratio would be 2:1 (20×100 Mbps vs. 1000 Mbps).

As described herein, in addition to opportunistic data object replication, various embodiments provide for proactively replicating data objects that are not already in a given cache (but that are popular) so that hot spots can be further reduced (or eliminated) and the load is better balanced.

Compared to the traditional IP-based approach (where replication is usually done at the server, VM and/or storage level), by using NDN according to various embodiments the replication may be at a very fine granule (e.g., at each individual data object level).

Also, using various embodiments, proactive replication does not require careful placement of the data objects—popular data objects can be randomly placed at any of the server(s) in the datacenter/network. In other words, data objects under the same hierarchy do not require a placement to the same server or even the same subnet.

Figure 2:
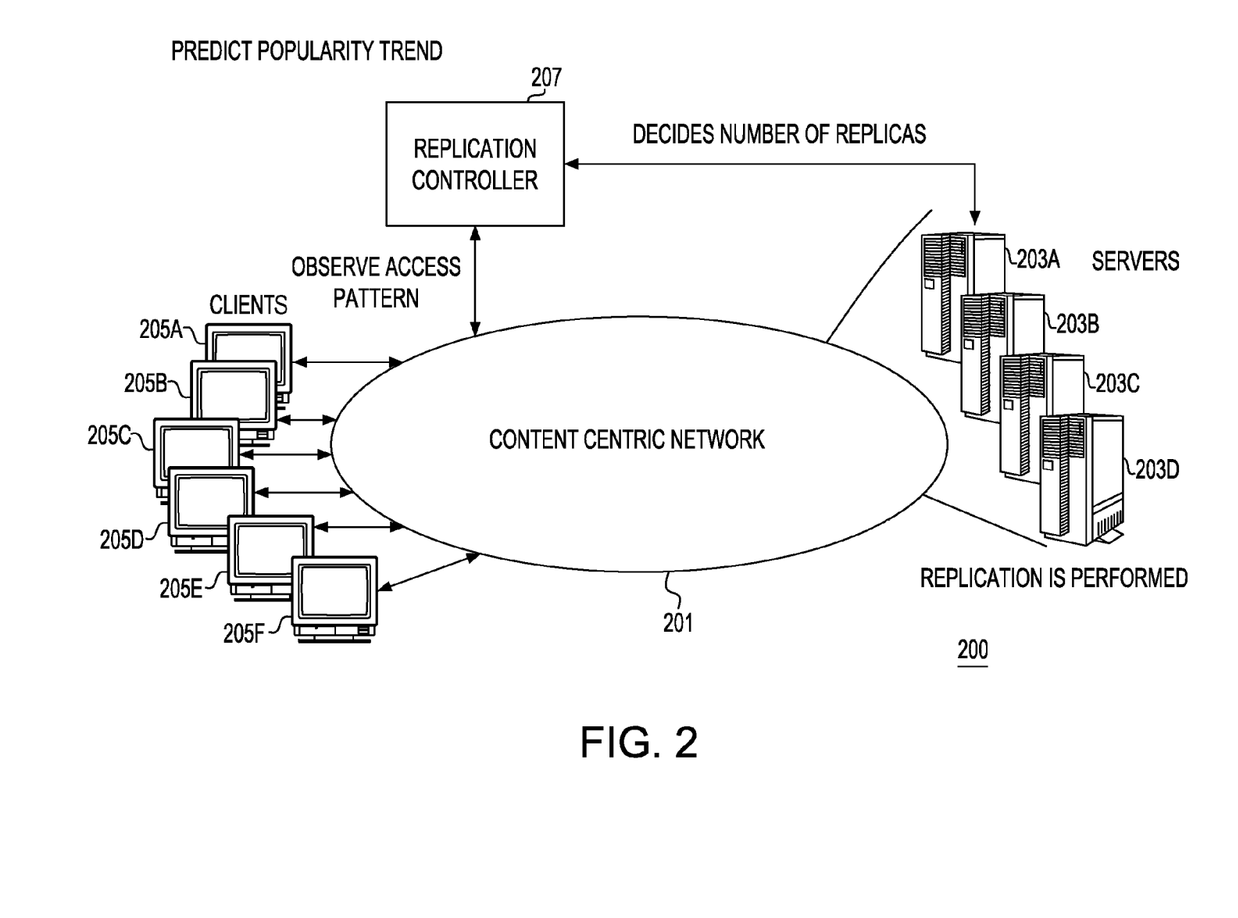
FIG. 2 depicts a block diagram of a system according to an embodiment of the present invention.

Reference will now be made to FIG. 2, showing a system according to one embodiment. As seen in this FIG. 2, in system 200 a content centric network 201 (having therein a plurality of data objects) may include a plurality of servers 203A-203D. Each of servers 203A-203D may have associated therewith one or more caches in the content centric network 201 (not shown). Also the servers 203A-203D will have storage devices that store data objects which may be requested by the client computers (discussed below). Further, while four servers are shown in the Fig., any desired number of servers may be utilized.

Still referring to FIG. 2, it is seen that a plurality of client computers 205A-205F may communicate with content centric network 201 (while six client computers are shown in the Fig., any desired number of client computers may be utilized).

Still referring to FIG. 2, it is seen that NDN replication controller 207 observes the access patterns (e.g., access frequency) of data objects and keeps trend information (e.g., history of access frequency over a certain time period). The NDN replication controller 207 may estimate and predict the future popularity of an object using well known predictive algorithms such as, e.g., linear regression, AMNIA, exponential smoothing, and Holt-Winters algorithm. The NDN replication controller 207 may also query caches in the content centric network and the storages of servers 203A-203D for current content (e.g., the presence of data object(s); in addition, any desired number of replication controller(s) may be utilized). For the data objects that are popular but not already in the caches or the number of copies present in the server storage is not enough to handle frequent request, the NDN replication controller 207 proactively creates one or more replicas. In one example, one or more replicas may be created since each cache provides only a limited space, and a data object that is popular may have been evicted due to a cache management policy; in another example one or more replicas may be created even if a data object is already cached if the demand is sufficiently great.

In one example, once replication controller 207 finishes creating and placing replicas it informs an NDN route controller about the new data object locations. The NDN route controller then informs one or more NDN routers about the new data object locations so that they can update the forwarding rules. Additional tasks may then be handled by the NDN layer, which enables name-based routing and directs requests to the closest copy. The approach of this example removes the need for load balancer, planned data replication & placement decisions, and potentially large-scale data movement.

In one example, the replication controller 207 may determine how many replicas need to be created (e.g., for each data object or a group of objects such as a web content with an HTML file and associated image files) based on the access frequency (e.g., of each data object) and/or the trend information (e.g., increasing, decreasing, stable) in the access frequency (e.g., of each data object or a group of objects). This decision may try to optimize some objective function. For example, the objective function may be to reduce the access latency by uniformly distributing R(k) copies of the same data object. The value R(k) can be computed based on the current access frequency, current number of copies, and/or trend in access frequency (increasing, decreasing, stable). In a simple case, R(k) is determined based on the frequency of the access. For example, the top K most accessed object instances that have been accessed in the previous time window are selected for replication. In other words, if an object has been replicated and the access frequency to each object instances are still high then they can be further replicated. The frequency can be based, for example, on the moving average, exponential smoothing, or predicted popularity in the future.

In one example, the target location(s) for replication may be determined by the replication controller 207 based on the congestion level (and/or trend information) of each of one or more regions (or one or more subnets) in the datacenter/network so that replicas are placed at less congested servers. This can be achieved, for example, by probing candidate servers and reading the activity level of the servers (e.g., CPU, memory, disk, network utilization) and determining which ones are less busy.

In another example, the placement decision regarding the replication target location(s) may be simplified by randomly spreading one or more popular data objects over a wide region (or large number of subnets) of relatively uncongested regions (or subnets) in the datacenter/network. In one specific example, this may be determined by a simple threshold mechanism (e.g., congestion above or below a certain value).

In another example, the datacenter may include multiple cache nodes, which may be co-located to internet gateways to serve incoming requests from outside the datacenter and/or they may be co-located with aggregation switches to reduce traffic going to upper links which have high over subscription ratio.

Creation of the replica(s) at different location(s) (e.g. different racks under different aggregation switches) in the datacenter/network may, under certain circumstances, require consumption of extra bandwidth. Therefore, in various examples, the frequency of replication may be carefully controlled, and the timing of the replication operation(s) may be decided considering current datacenter/network traffic and load level. Further, replication operation(s) may also take into account the size of the data objects that need to be replicated.

Figure 3:
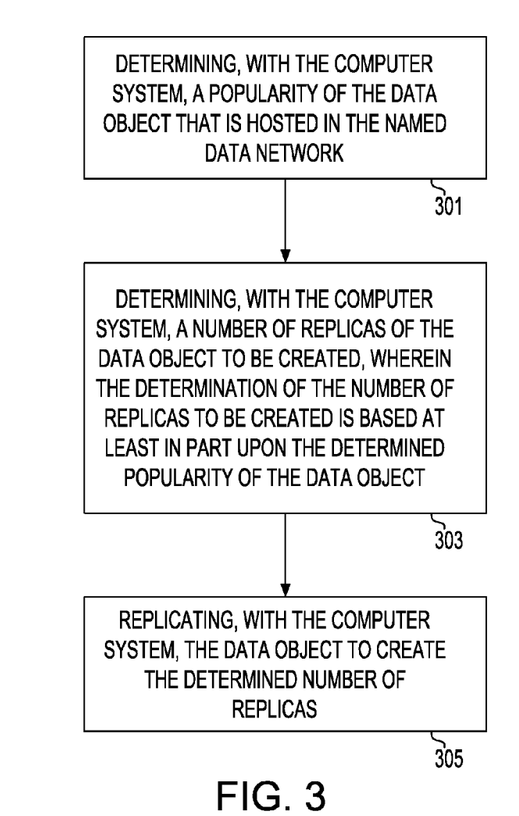
FIG. 3 depicts a flowchart of a method according to an embodiment of the present invention.

Referring now to FIG. 3, a method implemented in a computer system (or network) for replicating at least one data object that is hosted in a named data network is shown. As seen in this FIG. 3, the method comprises: Step 301—determining, with the computer system, a popularity of the data object that is hosted in the named data network; Step 303—determining, with the computer system, a number of replicas of the data object to be created, wherein the determination of the number of replicas to be created is based at least in part upon the determined popularity of the data object; and Step 305—replicating, with the computer system, the data object to create the determined number of replicas.

In one example, the method may comprise: determining, with the computer system, a respective popularity of each of a plurality of data objects that are hosted in the named data network; determining, with the computer system, for each of the plurality of data objects a number of replicas of each data object to be created, wherein the determination of the number of replicas to be created for each data object is based at least in part upon the determined respective popularity of each data object; and replicating, with the computer system, each data object to create the determined number of replicas for each data object.

In another example, the replicating may comprise placing, with the computer system, each of the created replicas on a respective element of the named data network.

In another example, each element of the named data network may be selected from the group including one or more servers, one or more routers, and/or one or more caches.

Figure 4:
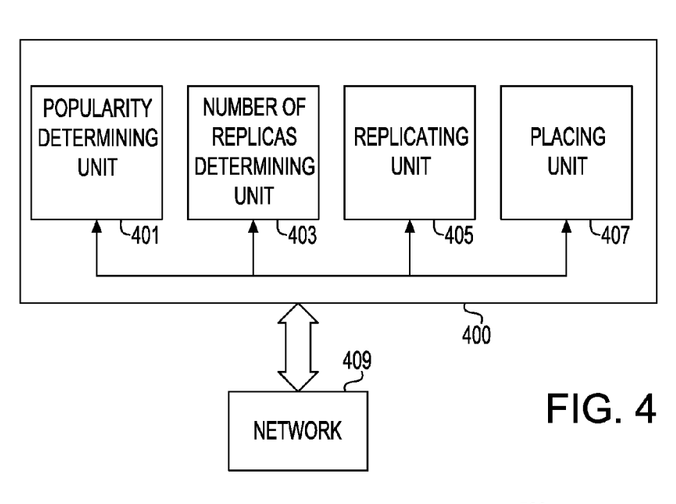
FIG. 4 depicts a block diagram of a system according to an embodiment of the present invention.

Referring now to FIG. 4, a computer-implemented system (or network) for replicating at least one data object that is hosted in a named data network is shown. As seen in this FIG. 4, the system 400 includes: a popularity determining unit 401 configured to determine a popularity of the data object that is hosted in the named data network; a number of replicas determining unit 403 that is in operative communication with the popularity determining unit and that is configured to determine a number of replicas of the data object to be created, wherein the determination of the number of replicas to be created is based at least in part upon the determined popularity of the data object; and a replicating unit 405 in operative communication with the number of replicas determining unit configured to replicate the data object to create the determined number of replicas.

Still referring to FIG. 4, system 400 may further include a placing unit 407 in operative communication with the replicating unit 405 configured to place each of the replicas that had been replicated on a respective element of the named data network.

In another example, each element of the named data network may be selected from the group including one or more servers, one or more routers, and/or one or more caches.

Still referring to FIG. 4, any communications may be carried out via network 409. Network 409 may comprise the Internet, an intranet, a datacenter network, a local area network, a wide area network and/or any other desired communication channel(s).

Figure 5:
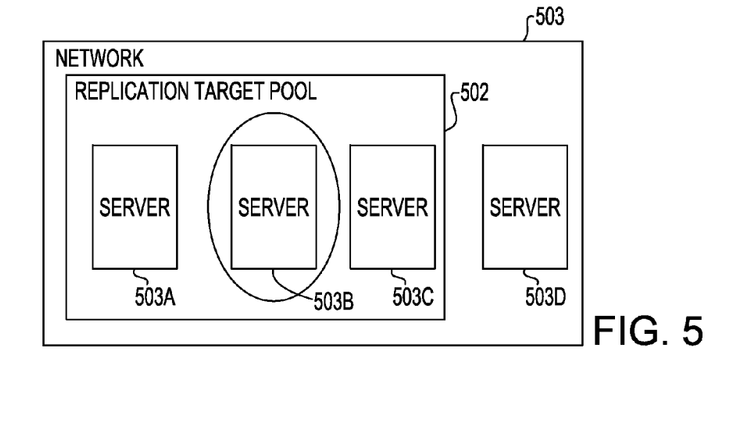
FIG. 5 depicts a block diagram of a system according to an embodiment of the present invention.

With reference now to FIG. 5, it is seen that in one example, a replication target pool 502 may be selected (e.g., by a replication controller of the type shown in FIG. 2) based at least in part upon a congestion level of the named data network 503 (including, in this example, servers 503A-503D). Such a replication target pool 502 may comprise possible elements of the named data network 503 on which a respective replica may be placed. Further, as seen, such a replication target pool 502 comprises a subset of the elements of the named data network 503.

Still referring to FIG. 5, it is seen that in this example, a replication target 505 may be selected (e.g., by a replication controller of the type shown in FIG. 2) as one of the elements of the named data network 503 in the replication target pool 502 (in one specific example, the replication target 505 for a respective replica may be randomly selected from among the replication target pool 502).

Figure 6:
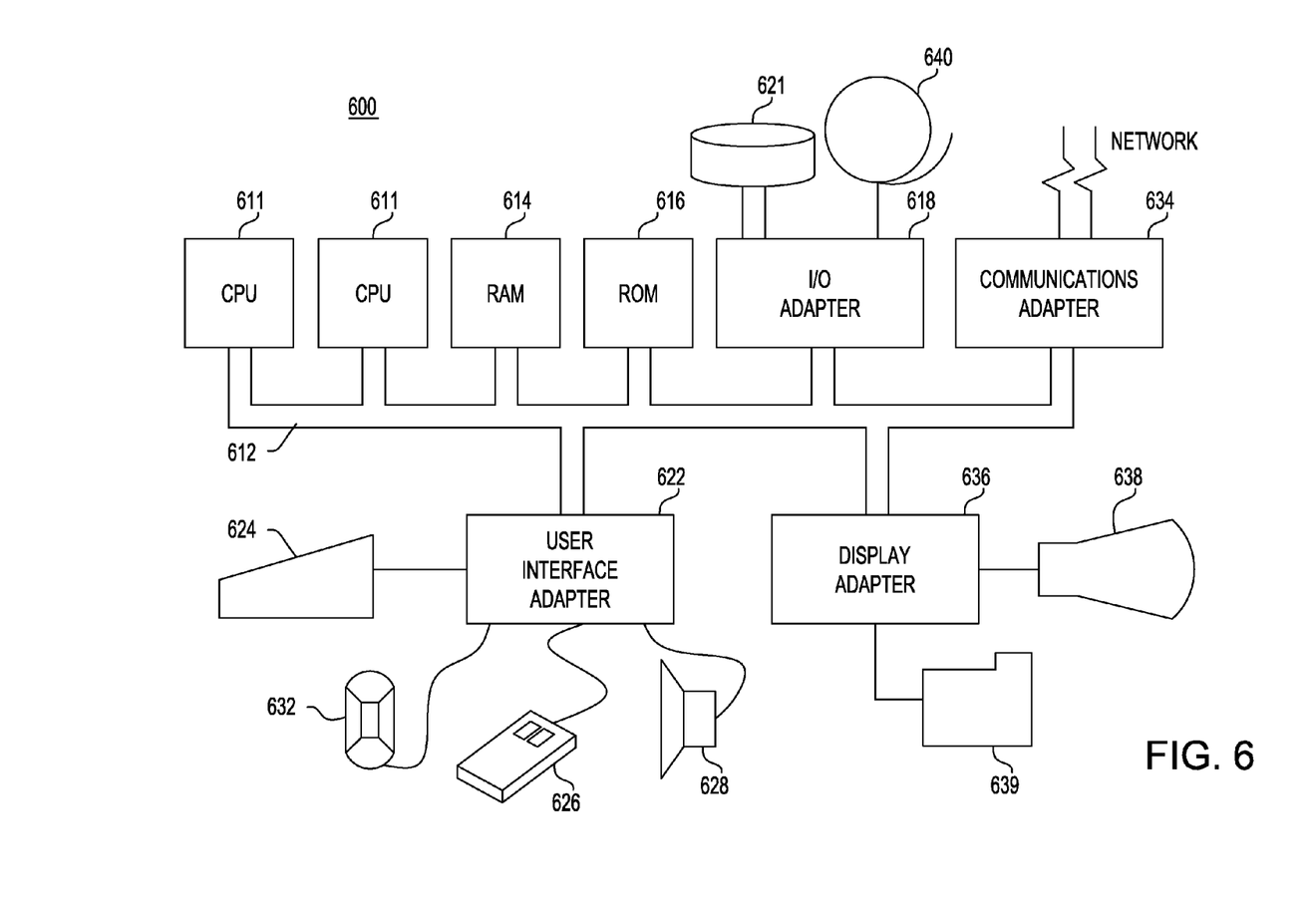
FIG. 6 depicts a block diagram of a system according to an embodiment of the present invention.

Referring now to FIG. 6, this figure shows a hardware configuration of computing system 600 according to an embodiment of the present invention. As seen, this hardware configuration has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

Figure 7:
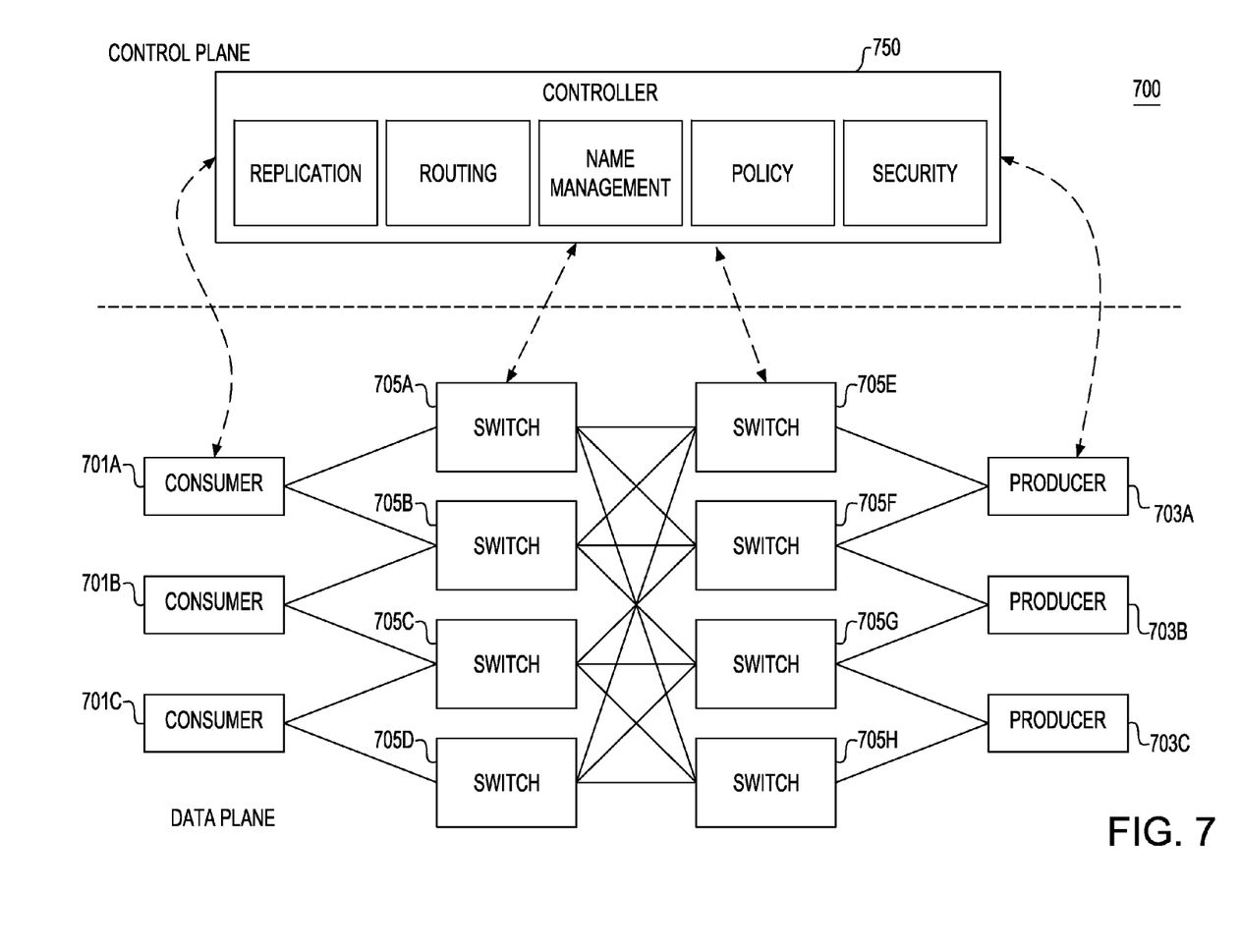
FIG. 7 depicts a block diagram of a system according to an embodiment of the present invention.

Referring now to FIG. 7, an example named data networking architecture 700 according to an embodiment is shown. As seen in this example, consumers 701A, 701B and 701C interact with producers 703A, 703B and 703C via switches (or routers) 705A, 705B, 705C, 705D, 705E, 705F, 705G and/or 705H.

Further, controller 750 (which may be a single controller or may comprise a plurality of controllers) may include mechanisms for providing replication, routing, name management, policy and/or security.

Further still, as seen, in this NDN architecture, there is a logical division between control plane and data plane. In the control plane, there may be one or more controllers that are controlling various aspects of NDN operation. The NDN router controller is one of them, managing the NDN routers and their forwarding rules. The NDN replication controller can be another one (such an NDN replication controller may be responsible for replicating the various content).

Still referring to FIG. 7, communication (e.g., requests, responses, data objects) between and among the various entities (indicated by the solid lines between the entities) may be bi-directional. Further, communication between and among the various entities and the controller 750 may be bi-directional (of note, controller 750 may communicate with any desired number of consumer(s), switch(es), router(s) and/or producer(s)). Further still, the communication may be carried out via the Internet, an intranet, a local area network, a wide area network and/or any other desired communication channel(s).

Of note, while FIG. 7 shows the various entities communicating, it is to be understood that this FIG. 7 is actually referring to communication by computer system(s) or the like that are owned, leased, operated, used by, in the possession of and/or controlled by each of the entities.

In one embodiment, a method implemented in a computer system for replicating at least one data object that is hosted in a named data network is provided, the method comprising: determining, with the computer system, a popularity of the data object that is hosted in the named data network; determining, with the computer system, a number of replicas of the data object to be created, wherein the determination of the number of replicas to be created is based at least in part upon the determined popularity of the data object; and replicating, with the computer system, the data object to create the determined number of replicas.

In one example, the replicating comprises placing, with the computer system, each of the created replicas on a respective element of the named data network.

In another example, the determined popularity is selected from the group including: (a) past popularity; (b) a predicted future popularity; and (c) a combination of a past popularity and a future predicted popularity.

In another example, the determination of the number of replicas to be created is further based upon a congestion level of the named data network.

In another example, each element of the named data network is selected from the group including: (a) a server, (b) a router; and (c) a cache.

In another example, each element of the named data network is located in a datacenter.

In another example, the method further comprises: selecting a replication target pool based at least in part upon a congestion level of the named data network; wherein the replication target pool comprises possible elements of the named data network on which a respective replica may be placed; and wherein the replication target pool comprises a subset of the elements of the named data network.

In another example: a replication target is one of the elements of the named data network in the replication target pool; and a replication target for a respective replica is randomly selected from among the replication target pool.

In another example, the named data network is used in connection with at least one cellular communications network.

In another embodiment, a computer readable storage medium, tangibly embodying a program of instructions executable by the computer for replicating at least one data object that is hosted in a named data network is provided, the program of instructions, when executing, performing the following steps: determining, with the computer system, a popularity of the data object that is hosted in the named data network; determining, with the computer system, a number of replicas of the data object to be created, wherein the determination of the number of replicas to be created is based at least in part upon the determined popularity of the data object; and replicating, with the computer system, the data object to create the determined number of replicas.

In one example, the replicating comprises placing, with the computer system, each of the created replicas on a respective element of the named data network.

In another example, the determined popularity is selected from the group including: (a) past popularity; (b) a predicted future popularity; and (c) a combination of a past popularity and a future predicted popularity.

In another example, the determination of the number of replicas to be created is further based upon a congestion level of the named data network.

In another example, each element of the named data network is selected from the group including: (a) a server, (b) a router; and (c) a cache.

In another example, each element of the named data network is located in a datacenter.

In another example: the program of instructions, when executing, further selects a replication target pool based at least in part upon a congestion level of the named data network; the replication target pool comprises possible elements of the named data network on which a respective replica may be placed; and the replication target pool comprises a subset of the elements of the named data network.

In another example: a replication target is one of the elements of the named data network in the replication target pool; and a replication target for a respective replica is randomly selected from among the replication target pool.

In another example, the named data network is used in connection with at least one cellular communications network.

In another embodiment, a computer-implemented system for replicating at least one data object that is hosted in a named data network is provided, the system comprising: a popularity determining unit configured to determine a popularity of the data object that is hosted in the named data network; a number of replicas determining unit that is in operative communication with the popularity determining unit and that is configured to determine a number of replicas of the data object to be created, wherein the determination of the number of replicas to be created is based at least in part upon the determined popularity of the data object; and a replicating unit in operative communication with the number of replicas determining unit configured to replicate the data object to create the determined number of replicas.

In one example, the system further comprises a placing unit in operative communication with the replicating unit configured to place each of the replicas that had been replicated on a respective element of the named data network.

In another example, the determined popularity is selected from the group including: (a) past popularity; (b) a predicted future popularity; and (c) a combination of a past popularity and a future predicted popularity.

In another example, the determination of the number of replicas to be created is further based upon a congestion level of the named data network.

In another example, each element of the named data network is selected from the group including: (a) a server, (b) a router; and (c) a cache.

In another example, each element of the named data network is located in a datacenter.

In another example: the replicating unit selects a replication target pool based at least in part upon a congestion level of the named data network; the replication target pool comprises possible elements of the named data network on which a respective replica may be placed; and the replication target pool comprises a subset of the elements of the named data network.

In another example: a replication target is one of the elements of the named data network in the replication target pool; and a replication target for a respective replica is randomly selected from among the replication target pool.

In another example, the named data network is used in connection with at least one cellular communications network.

As described herein, various embodiments provide for reducing and/or removing hotspots in a datacenter that employs named data networking. More specifically, various embodiments may provide for: (a) determining a popularity of data objects hosted in the datacenter; (b) determining a number of replicas to be created based on popularity of data objects (e.g., historical access frequency, historical request frequency, historical trend, predicted access frequency, predicted request frequency, and/or predicted trend) and/or congestion (load) level in the datacenter employing named data networking; and (c) creating replicas of the popular data objects in uncongested nodes (e.g., servers, routers and/or switches) and/or caching the popular data objects at intermediate nodes (e.g., servers, routers and/or switches).

As described herein, various embodiments may be applied to any named data network (e.g., in a datacenter environment and/or a cloud environment).

As described herein, various embodiments provide proactive replication (e.g., to reduce and/or remove hotspots in a network (e.g., named data network)).

As described herein, in various embodiments careful placement of the data objects is not required (e.g., popular objects can be randomly placed at any server(s)). In various specific examples, data objects under the same hierarchy do not require a placement to the same server or even the same subnet. This is due to the basic functionality provided by NDN that locating objects is not done via address hierarchy but based on the names of individual objects.

As described herein, in various embodiments there is no need for a load balancer in front of the servers.

In another example, a replication target pool is selected based on the congestion (load) level.

In another example, a replication target pool is selected based on the predicted congestion (load) level in the future.

In another example, a replication target may be randomly selected.

In another example, a replication decision may be based on future trend information (in addition to the current popularity).

In another example, the named data network may be used in a datacenter and/or may be used in one or more cellular networks.

As described herein, various embodiments provide for replicating content, such as data objects, to reduce and/or remove hotspots. In one example, replicating individual data objects to reduce and/or remove hotspots may be provided.

As described herein, various embodiments provide for: (a) determining the popularity of content, such as data objects; (b) deciding how many replicas need to be created (e.g., for each data object) based on popularity (e.g., of each data object); (c) replicating the content (e.g., data objects); and (d) placing the replicated content on other servers and/or caches to reduce and/or remove hotspots.

In other examples, implementation may be in the context of: (a) cloud: delivery model—Infrastructure as a Service (IaaS); (b) cloud—delivery model—Platform as a Service (PaaS); (c) cloud—delivery model—Software as a Service (SaaS); (d) cloud—deployment model—private; (e) cloud—deployment model—public; (f) cloud—resource enablement—provisioning, deployment, elasticity and workload management; (g) software—content applications; and/or (h) software—system and network management software.

As described herein, various embodiments use caching and data replication in a datacenter on top of the named data networking protocol. Conventionally, the most popular data objects are typically cached close to the requester, at gateway routers, top level switches, and so on, so that the requests for these most popular data objects do not need to traverse to the origin server. In various examples, data objects that are popular but not currently cached may still create hot spots and they may be proactively replicated to less busy areas of the datacenter.

In one example, the frequency of data object access history can be used for prediction of future trends (e.g., if the data objects are becoming more popular, less popular, or their popularity is stable). The prediction can be done, for example, by employing such known algorithms as linear regression, ARIMA (autoregressive integrated moving average), and/or Holt-Winters method. Based on the statistics (e.g., prediction of future trends), a determination may be made as to how many replicas of each data object should be created, then the replicated data objects are placed at less congested areas in the datacenter. In another example, the new placement information is sent to one or more NDN route controllers for update.

In another example, a predicted future popularity may include a predicted future trend.

Compared to the conventional datacenter replication strategy, use of NDN technology as described herein significantly simplifies the content replication, since there would typically be no need to reconfigure load balancing and change routing entries. Also use of NDN technology as described herein enables much finer grain load balancing (content replication)—e.g., at each individual data object level (e.g., granularity of files), rather than server, VM, or storage device level.

Using an NDN object placement strategy as described herein also becomes simplified since now the data objects can be randomly placed without necessitating a careful planning. Compared to the conventional NDN object replication strategy, caching decisions may be based on explicit control decision rather than relying on simple opportunistic strategy.

As described herein, a data object may be content in a datacenter and/or on a network.

In another example, the proactive data object replication approach described herein may be applied in an environment without caches.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method implemented in a computer system for replicating at least one data object that is hosted in a named data network, the method comprising:
    determining, with the computer system, a popularity of the data object that is hosted in the named data network;
    determining, with the computer system, a number of replicas of the data object to be created, wherein the determination of the number of replicas to be created is based at least in part upon the determined popularity of the data object; and
    replicating, with the computer system, the data object to create the determined number of replicas;
    wherein the method further comprises selecting a replication target pool based at least in part upon a congestion level of the named data network;

wherein the replication target pool comprises possible elements of the named data network on which a respective replica may be placed;
wherein the replication target pool comprises a subset of the elements of the named data network;
wherein a replication target is one of the elements of the named data network in the replication target pool; and
wherein a replication target for a respective replica is randomly selected from among the replication target pool.

2. The method of claim 1, wherein the replicating comprises placing, with the computer system, each of the created replicas on a respective element of the named data network.

3. The method of claim 1, wherein the determined popularity is selected from the group including: (a) past popularity; (b) a predicted future popularity; and (c) a combination of a past popularity and a future predicted popularity.

4. The method of claim 1, wherein the determination of the number of replicas to be created is further based upon a congestion level of the named data network.

5. The method of claim 1, wherein each element of the named data network is selected from the group including: (a) a server, (b) a router; and (c) a cache.

6. The method of claim 1, wherein each element of the named data network is located in a datacenter.

7. The method of claim 1, wherein the named data network is used in connection with at least one cellular communications network.

\* \* \* \* \*